(12) United States Patent
Kaminsky et al.

(10) Patent No.: US 8,079,933 B2
(45) Date of Patent: Dec. 20, 2011

(54) METHOD AND APPARATUS TO CONTROL ENGINE TORQUE TO PEAK MAIN PRESSURE FOR A HYBRID POWERTRAIN SYSTEM

(75) Inventors: Lawrence A. Kaminsky, Sterling Heights, MI (US); Anthony H. Heap, Ann Arbor, MI (US); Jy-Jen F. Sah, West Bloomfield, MI (US)

(73) Assignees: GM Global Technology Operations LLC, Detroit, MI (US); Daimler AG, Stuttgart (DE); Chrysler LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 616 days.

(21) Appl. No.: 12/250,533

(22) Filed: Oct. 13, 2008

(65) Prior Publication Data
US 2009/0118083 A1    May 7, 2009

Related U.S. Application Data

(60) Provisional application No. 60/985,268, filed on Nov. 4, 2007.

(51) Int. Cl.
*B60W 10/02* (2006.01)
*F16H 59/00* (2006.01)
*B60W 10/04* (2006.01)

(52) U.S. Cl. ............... 477/5; 477/98; 477/107
(58) Field of Classification Search .......... 477/5, 98, 477/107, 76, 83
See application file for complete search history.

(56) References Cited

U.S. PATENT DOCUMENTS

| | | | |
|---|---|---|---|
| 5,199,326 A * | 4/1993 | Iwatsuki et al. | 477/98 |
| 6,440,041 B1 * | 8/2002 | Riedle et al. | 477/107 |
| 6,634,984 B1 * | 10/2003 | Doering et al. | 477/107 |
| 6,832,148 B1 | 12/2004 | Bennett | |
| 6,835,160 B2 * | 12/2004 | Kitano et al. | 477/5 |
| 6,868,318 B1 | 3/2005 | Cawthorne | |
| 6,913,558 B2 * | 7/2005 | Mori et al. | 477/3 |
| 7,154,236 B1 | 12/2006 | Heap | |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0252283 A1 | 11/2005 | Heap | |
| 2005/0252305 A1 | 11/2005 | Hubbard | |
| 2005/0252474 A1 | 11/2005 | Sah | |
| 2005/0255963 A1 | 11/2005 | Hsieh | |

(Continued)

*Primary Examiner* — Roger Pang

(57) ABSTRACT

A method to control a powertrain including a transmission, an engine, and an electric machine includes monitoring a rotational speed of the engine, monitoring a temperature of a transmission fluid, determining a maximum hydraulic pressure within a hydraulic control system based upon the rotational speed of the engine and the temperature of the transmission fluid, determining a predicted clutch torque capacity based upon the maximum hydraulic pressure, generating a preferred input torque from the engine based upon the predicted clutch torque capacity, and utilizing the preferred input torque to control the engine.

11 Claims, 6 Drawing Sheets

U.S. PATENT DOCUMENTS

| | | |
|---|---|---|
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Heap |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |

| | | | | | |
|---|---|---|---|---|---|
| 2009/0118936 A1 | 5/2009 | Heap | 2009/0118950 A1 | 5/2009 | Heap |
| 2009/0118937 A1 | 5/2009 | Heap | 2009/0118951 A1 | 5/2009 | Heap |
| 2009/0118938 A1 | 5/2009 | Heap | 2009/0118952 A1 | 5/2009 | Heap |
| 2009/0118939 A1 | 5/2009 | Heap | 2009/0118954 A1 | 5/2009 | Wu |
| 2009/0118940 A1 | 5/2009 | Heap | 2009/0118957 A1 | 5/2009 | Heap |
| 2009/0118941 A1 | 5/2009 | Heap | 2009/0118962 A1 | 5/2009 | Heap |
| 2009/0118942 A1 | 5/2009 | Hsieh | 2009/0118963 A1 | 5/2009 | Heap |
| 2009/0118943 A1 | 5/2009 | Heap | 2009/0118964 A1 | 5/2009 | Snyder |
| 2009/0118944 A1 | 5/2009 | Heap | 2009/0118969 A1 | 5/2009 | Heap |
| 2009/0118945 A1 | 5/2009 | Heap | 2009/0118971 A1 | 5/2009 | Heap |
| 2009/0118946 A1 | 5/2009 | Heap | 2009/0118999 A1 | 5/2009 | Heap |
| 2009/0118947 A1 | 5/2009 | Heap | 2009/0144002 A1 | 6/2009 | Zettel |
| 2009/0118948 A1 | 5/2009 | Heap | | | |
| 2009/0118949 A1 | 5/2009 | Heap | | | |

* cited by examiner

METHOD AND APPARATUS TO CONTROL ENGINE TORQUE TO PEAK MAIN PRESSURE FOR A HYBRID POWERTRAIN SYSTEM

CROSS REFERENCE TO RELATED APPLICATION

This application claims the benefit of U.S. Provisional Application No. 60/985,268 filed on Nov. 4, 2007 which is hereby incorporated herein by reference.

TECHNICAL FIELD

This disclosure pertains to control systems for electro-mechanical transmissions.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electro-mechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

Operation of the above devices within a hybrid powertrain vehicle require management of numerous torque bearing shafts or devices representing connections to the above mentioned engine, electrical machines, and driveline. Input torque from the engine and an electric machine torque or electric machine torques can be applied individually or cooperatively to provide output torque. Various control schemes and operational connections between the various aforementioned components of the hybrid drive system are known, and the control system must be able to engage these components to and disengage the components from the transmission in order to perform the functions of the hybrid powertrain system. Engagement and disengagement are known to be accomplished within the transmission by employing selectively operable clutches.

Clutches are devices well known in the art for engaging and disengaging shafts including the management of rotational velocity and torque differences between the shafts. Clutches are known in a variety of designs and control methods. One known type of clutch is a mechanical clutch operating by separating or joining two connective surfaces, for instance, clutch plates, operating, when joined, to apply frictional torque to each other. One control method for operating such a mechanical clutch includes applying a hydraulic control system implementing fluidic pressures transmitted through hydraulic lines to exert or release clamping force between the two connective surfaces. Operated thusly, the clutch is not operated in a binary manner, but rather is capable of a range of engagement states, from fully disengaged, to synchronized but not engaged, to engaged but with only minimal clamping force, to engaged with some maximum clamping force. The clamping force available to be applied to the clutch determines how much reactive torque the clutch can carry before the clutch slips. Clutches can be asynchronous, designed to accommodate slip, or clutches can be synchronous, designed to operate with little or no slip. This disclosure is related primarily to synchronous clutches.

The hydraulic control system, as described above, utilizes lines charged with hydraulic oil to selectively activate clutches within the transmission. However, the hydraulic control system is also known to perform a number of other functions in a hybrid powertrain. For example, an electric machine utilized within a hybrid powertrain generates heat. Known embodiments utilize hydraulic oil from the hydraulic control system in a continuous flow to cool the electric machine in a base machine cooling function. Other known embodiments additionally are known to react to higher electric machine temperatures with a selectable or temperature driven active machine cooling function, providing additional cooling in the high temperature condition. Additionally, known embodiments utilize hydraulic oil to lubricate mechanical devices, such as bearings. Also, hydraulic circuits are known to include some level of internal leakage.

Hydraulic oil is known to be pressurized within a hydraulic control system with a pump. The pump can be electrically powered or preferably mechanically driven. In addition to this first main hydraulic pump, hydraulic control systems are known to also include an auxiliary hydraulic pump. The internal impelling mechanism rotates or operates at some speed, drawing hydraulic oil from a return line and pressurizing the hydraulic control system. The supply of hydraulic flow by the pump or pumps is affected by the speed of the pumps, the back pressure exerted by the hydraulic line pressure ($P_{LINE}$), and the temperature of the hydraulic fluid or oil ($T_{OIL}$).

The resulting or net $P_{LINE}$ within the hydraulic control system is impacted by a number of factors. FIG. 1 schematically illustrates a model of factors impacting hydraulic flow in an exemplary hydraulic control system, in accordance with the present disclosure. As one having ordinary skill in the art will appreciate, conservation of mass explains that, in steady state, flow entering a system must equal the flow exiting from that system. As applied to FIG. 1, a flow of hydraulic oil is supplied to the hydraulic control system by the pumps. The flow exits the hydraulic control system through the various functions served by the hydraulic control system. This exemplary embodiment includes the following functions: hydraulic oil fills clutch mechanisms in order to provide clamping force required to lock the clutch, as described above; hydraulic oil provides both base cooling and active cooling of the electric machines and other components as required; hydraulic oil is used to lubricate portions of the transmission; and hydraulic oil flows through leakage internal to the hydraulic circuit. $P_{LINE}$ describes the resulting charge of hydraulic oil maintained in the system: for any flow through a system, the resulting pressure within the system depends upon the flow resistance within the system. Higher flow resistance in the system results in higher system pressures for a given flow. Conversely, lower flow resistance in the system results in lower system pressures for a given flow. Applied to FIG. 1, $P_{LINE}$ or the pressure within the hydraulic control system, changes depending upon usage of the hydraulic control system. For example, filling a previously unfilled transmission clutch consumes a significant amount of hydraulic oil from the hydraulic control system. The orifice leading to the clutch includes low resistance in order to draw the significant amount of hydraulic oil over a short time span. As a result, during the clutch filling process, $P_{LINE}$ in an otherwise unchanged hydraulic control system will reduce. Conversely, for a given set of functions served by the hydraulic control system, $P_{LINE}$ varies based upon the flow supplied by the pumps. For any given set of flow restrictions associated with the functions served, increased flow from the pumps will result in higher $P_{LINE}$. By monitoring $P_{LINE}$ and modulating the operation of the pump or pumps supplying hydraulic flow to the hydraulic control system, $P_{LINE}$ can be controlled in light of desired line pressures and changing usage of the hydraulic control system.

As mentioned above, $P_{LINE}$ is directly applied to a clutch in order to lock the clutch and produce a clutch torque capacity. The magnitude of the clutch torque capacity of the clutch is directly related to $P_{LINE}$. A clutch control method utilizing hydraulic control system inputs to determine a preferred input torque from the engine based upon clutch torque capacities would be beneficial.

SUMMARY

A powertrain includes an electro-mechanical transmission mechanically-operatively coupled to an internal combustion engine and an electric machine adapted to selectively transmit mechanical power to an output member. A method to control the powertrain includes monitoring a rotational speed of the engine, monitoring a temperature of a transmission fluid, determining a maximum hydraulic pressure within a hydraulic control system based upon the rotational speed of the engine and the temperature of the transmission fluid, determining a predicted clutch torque capacity based upon the maximum hydraulic pressure, generating a preferred input torque from the engine based upon the predicted clutch torque capacity, and utilizing the preferred input torque to control the engine.

BRIEF DESCRIPTION OF THE DRAWINGS

One or more embodiments will now be described, by way of example, with reference to the accompanying drawings, in which:

FIG. 3 is a schematic diagram of an exemplary architecture for a control system and powertrain, in accordance with the present disclosure;

DETAILED DESCRIPTION

Figure 2:
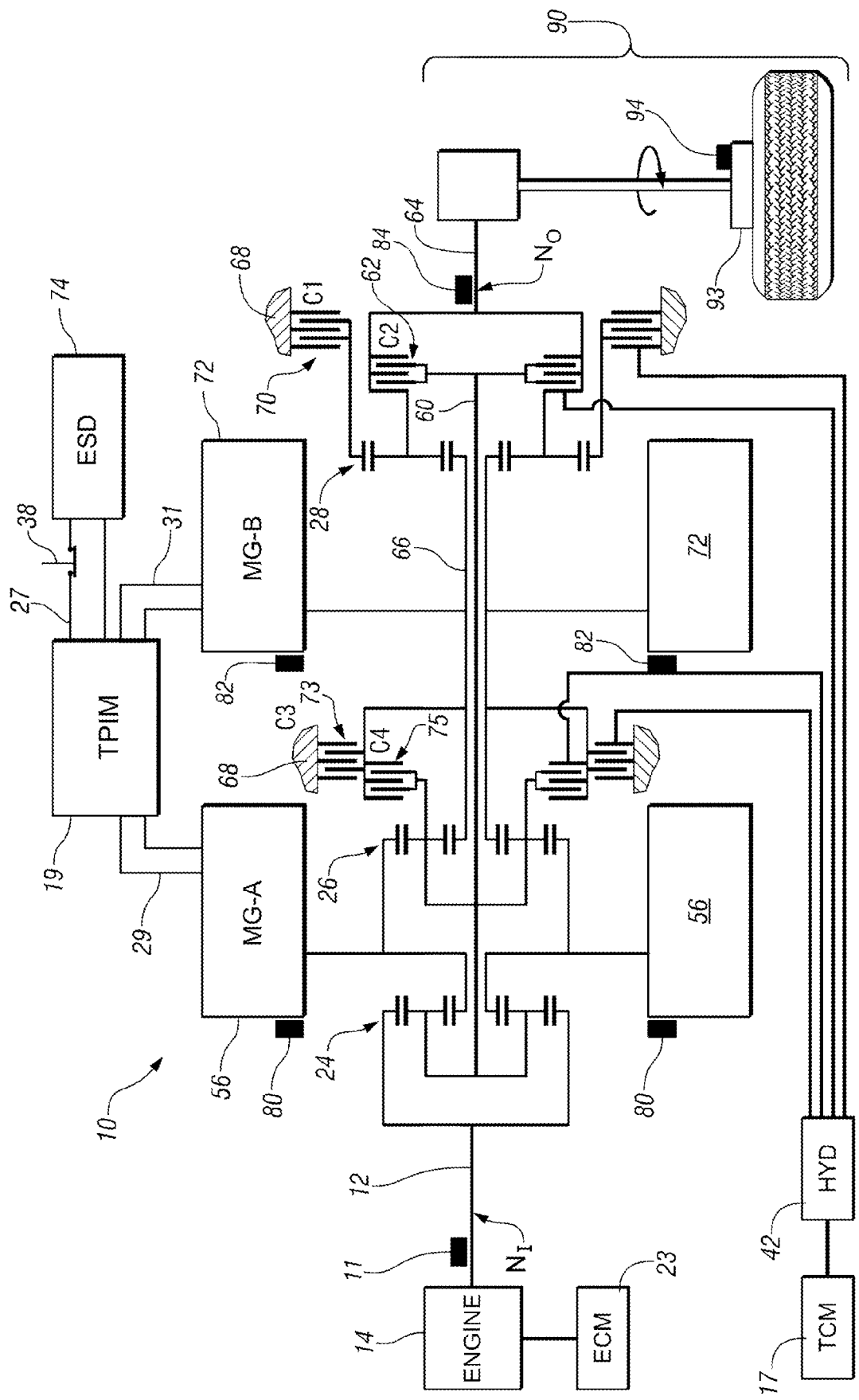
FIG. 2 is a schematic diagram of an exemplary powertrain, in accordance with the present disclosure.

Referring now to the drawings, wherein the showings are for the purpose of illustrating certain exemplary embodiments only and not for the purpose of limiting the same, FIGS. 2 and 3 depict an exemplary electro-mechanical hybrid powertrain. The exemplary electro-mechanical hybrid powertrain in accordance with the present disclosure is depicted in FIG. 2, comprising a two-mode, compound-split, electro-mechanical hybrid transmission 10 operatively connected to an engine 14 and first and second electric machines ('MG-A') 56 and ('MG-B') 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transmit torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and output torque, can differ from the input speed, $N_I$, and the input torque, $T_I$, to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power, e.g., to vehicle wheels 93, one of which is shown in FIG. 2. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS-WHL}$, the output of which is monitored by a control module of a distributed control module system described with respect to FIG. 3, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque commands for the first and second electric machines 56 and 72 to achieve the input torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to achieve the input torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 3 is a schematic block diagram of the distributed control module system. The elements described hereinafter comprise a subset of an overall vehicle control architecture, and provide coordinated system control of the exemplary powertrain described in FIG. 2. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electro-mechanical hybrid powertrain. The devices include an accelerator pedal 113 ('AP') from which an operator torque request is determined, an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the operator torque request ('$T_{O\_REQ}$'), a commanded output torque ('$T_{CMD}$') to the driveline 90, an engine input torque command, clutch torques for the torque-transfer clutches C1 70, C2 62, C3 73, C4 75 of the transmission 10; and the torque commands for the first and second electric machines 56 and 72, respectively. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

Each of the control modules ECM 23, TCM 17, TPIM 19 and BPCM 21 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the powertrain. Alternatively, algorithms may be executed in response to the occurrence of an event.

The exemplary powertrain selectively operates in one of several operating range states that can be described in terms of an engine state comprising one of an engine on state ('ON') and an engine off state ('OFF'), and a transmission state comprising a plurality of fixed gears and continuously variable operating modes, described with reference to Table 1, below.

TABLE 1

| Description | Engine State | Transmission Operating Range State | Applied Clutches | |
|---|---|---|---|---|
| MI_Eng_Off | OFF | EVT Mode I | C1 70 | |
| MI_Eng_On | ON | EVT Mode I | C1 70 | |
| FG1 | ON | Fixed Gear Ratio 1 | C1 70 | C4 75 |
| FG2 | ON | Fixed Gear Ratio 2 | C1 70 | C2 62 |
| MII_Eng_Off | OFF | EVT Mode II | C2 62 | |
| MII_Eng_On | ON | EVT Mode II | C2 62 | |
| FG3 | ON | Fixed Gear Ratio 3 | C2 62 | C4 75 |
| FG4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode I, or MI, is selected by applying clutch C1 70 only in order to "ground" the outer gear member of the third planetary gear set 28. The engine state can be one of ON ('MI_Eng_On') or OFF ('MI_Eng_Off'). A second continuously variable mode, i.e., EVT Mode II, or MII, is selected by applying clutch C2 62 only to connect the shaft 60 to the carrier of the third planetary gear set 28. The engine state can be one of ON ('MII_Eng_On') or OFF ('MII_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$, is achieved. A first fixed gear operation ('FG1') is selected by applying clutches C1 70 and C4 75. A second fixed gear operation ('FG2') is selected by applying clutches C1 70 and C2 62. A third fixed gear operation ('FG3') is selected by applying clutches C2 62 and C4 75. A fourth fixed gear operation ('FG4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine the commanded output torque, $T_{CMD}$, intended to meet the operator torque request, $T_{O\_REQ}$, to be executed at the output member 64 and transmitted to the driveline 90. Final vehicle acceleration is affected by other factors including, e.g., road load, road grade, and vehicle mass. The operating range state is determined for the transmission 10 based upon a variety of operating characteristics of the powertrain. This includes the operator torque request, communicated through the accelerator pedal 113 and brake pedal 112 to the user interface 13 as previously described. The operating range state may be predicated on a powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required to achieve the desired output torque to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transmit power therebetween to generate a power flow to the output member 64.

Figure 4:
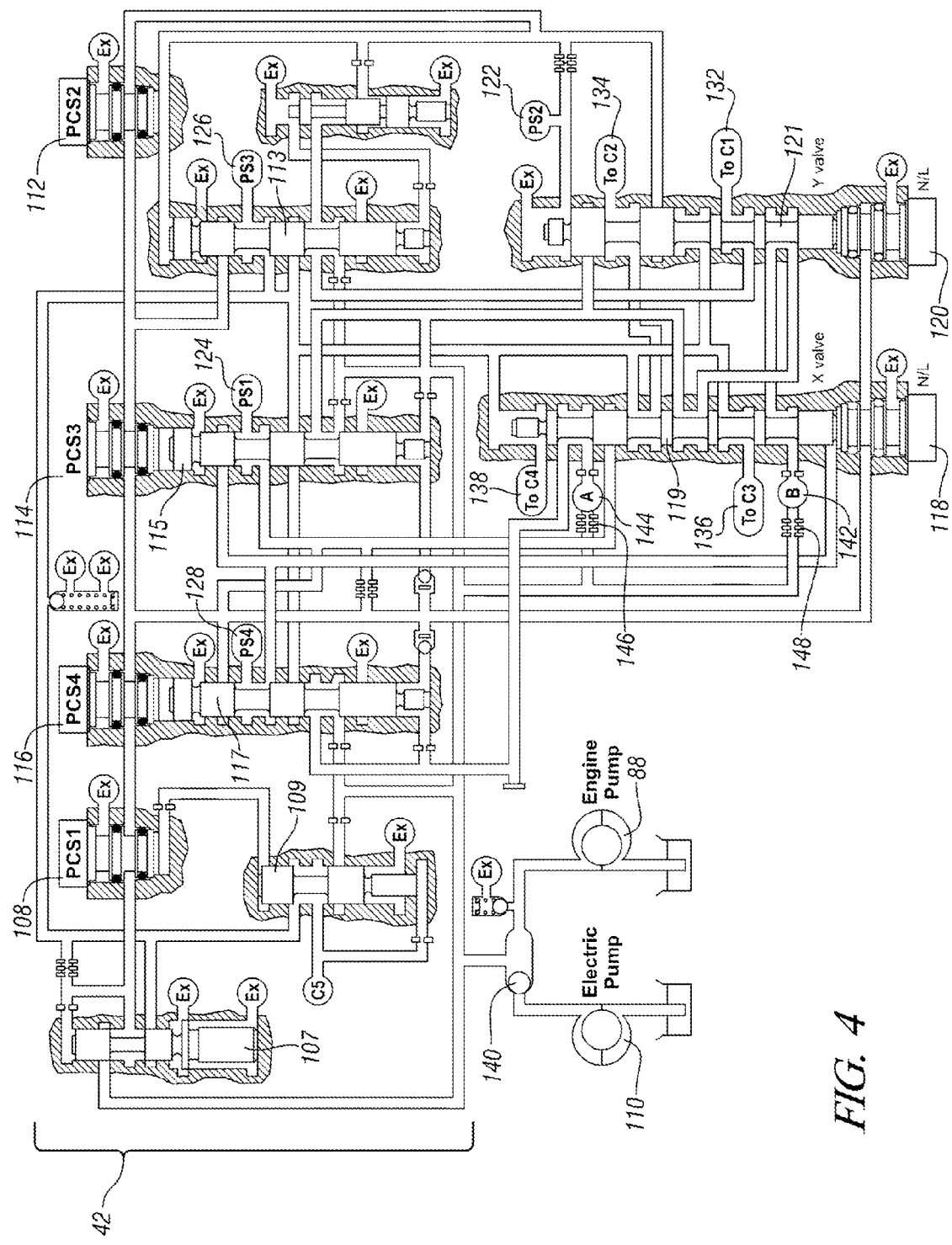
FIG. 4 is a schematic diagram of a hydraulic circuit, in accordance with the present disclosure.

FIG. 4 depicts a schematic diagram of the hydraulic control circuit 42 for controlling flow of hydraulic fluid in the exemplary transmission. A main hydraulic pump 88 is driven off the input shaft 12 from the engine 14, and an auxiliary pump 110 controlled by the TPIM 19 to provide pressurized fluid to the hydraulic control circuit 42 through valve 140. The auxiliary pump 110 preferably comprises an electrically-powered pump of an appropriate size and capacity to provide sufficient flow of pressurized hydraulic fluid into the hydraulic control circuit 42 when operational. The hydraulic control circuit 42 selectively distributes hydraulic pressure to a plurality of devices, including the torque-transfer clutches C1 70, C2 62, C3 73, and C4 75, active cooling circuits for the first and second electric machines 56 and 72 (not shown), and a base cooling circuit for cooling and lubricating the transmission 10 via passages 142, 144 (not depicted in detail). As previously stated, the TCM 17 actuates the various clutches to achieve one of the transmission operating range states through selective actuation of hydraulic circuit flow control devices comprising variable pressure control solenoids ('PCS') PCS1 108, PCS2 114, PCS3 112, PCS4 116 and solenoid-controlled flow management valves, X-valve 119 and Y-valve 121. The hydraulic control circuit 42 is fluidly connected to pressure switches PS1, PS2, PS3, and PS4 via passages 122, 124, 126, and 128, respectively. The pressure control solenoid PCS1 108 has a control position of normally high and is operative to modulate the magnitude of fluidic pressure in the hydraulic circuit through fluidic interaction with controllable pressure regulator 107 and spool valve 109. The controllable pressure regulator 107 and spool valve 109 interact with PCS1 108 to control hydraulic pressure in the hydraulic control circuit 42 over a range of pressures and may provide additional functionality for the hydraulic control circuit 42. Pressure control solenoid PCS3 112 has a control position of normally high, and is fluidly connected to spool valve 113 and operative to effect flow therethrough when actuated. Spool valve 113 is fluidly connected to pressure switch PS3 via passage 126. Pressure control solenoid PCS2 114 has a control position of normally high, and is fluidly connected to spool valve 115 and operative to effect flow therethrough when actuated. Spool valve 115 is fluidly connected to pressure switch PS2 via passage 124. Pressure control solenoid PCS4 116 has a control position of normally low, and is fluidly connected to spool valve 117 and operative to effect flow therethrough when actuated. Spool valve 117 is fluidly connected to pressure switch PS4 via passage 128.

The X-Valve 119 and Y-Valve 121 each comprise flow management valves controlled by solenoids 118, 120, respectively, in the exemplary system, and have control states of High ('1') and Low ('0'). The control states refer to positions of each valve to which control flow to different devices in the hydraulic control circuit 42 and the transmission 10. The X-valve 119 is operative to direct pressurized fluid to clutches C3 73 and C4 75 and cooling systems for stators of the first and second electric machines 56 and 72 via fluidic passages 136, 138, 144, 142 respectively, depending upon the source of the fluidic input, as is described hereinafter. The Y-valve 121 is operative to direct pressurized fluid to clutches C1 70 and C2 62 via fluidic passages 132 and 134 respectively, depending upon the source of the fluidic input, as is described hereinafter. The Y-valve 121 is fluidly connected to pressure switch PS1 via passage 122.

The hydraulic control circuit 42 includes a base cooling circuit for providing hydraulic fluid to cool the stators of the first and second electric machines 56 and 72. The base cooling circuit includes fluid conduits from the valve 140 flowing directly to a flow restrictor which leads to fluidic passage 144 leading to the base cooling circuit for the stator of the first electric machine 56, and to a flow restrictor which leads to fluidic passage 142 leading to the base cooling circuit for the stator of the second electric machine 72. Active cooling of stators for the first and second electric machines 56 and 72 is effected by selective actuation of pressure control solenoids PCS2 114, PCS3 112 and PCS4 116 and solenoid-controlled flow management valves X-valve 119 and Y-valve 121, which leads to flow of hydraulic fluid around the selected stator and permits heat to be transferred therebetween, primarily through conduction.

An exemplary logic table to accomplish control of the exemplary hydraulic control circuit 42 to control operation of the transmission 10 in one of the transmission operating range states is provided with reference to Table 2, below.

TABLE 2

| Transmission Operating Range State | X-Valve Logic No Latch | Y-Valve Logic C2 Latch | PCS1 Normal High | PCS2 Normal High | PCS3 Normal High | PCS4 Normal Low |
|---|---|---|---|---|---|---|
| EVT Mode I | 0 | 0 | Line Modulation | MG-B Stator Cool | C1 | MG-A Stator Cool |
| EVT Mode II | 0 | 1 | Line Modulation | C2 | MG-B Stator Cool | MG-A Stator Cool |
| Low Range | 1 | 0 | Line Modulation | C2 | C1 | C4 |
| High Range | 1 | 1 | Line Modulation | C2 | C3 | C4 |

A Low Range is defined as a transmission operating range state comprising one of the first continuously variable mode and the first and second fixed gear operations. A High Range is defined as a transmission operating range state comprising one of the second continuously variable mode and the third and fourth fixed gear operations. Selective control of the X-valve 119 and the Y-valve 121 and actuation of the solenoids PCS2 112, PCS3 114, PCS4 116 facilitate flow of hydraulic fluid to actuate clutches C1 70, C2 63, C3 73, and C4 75, and provide cooling for the stators the first and second electric machines 56 and 72.

In operation, a transmission operating range state, i.e. one of the fixed gear and continuously variable mode operations, is selected for the exemplary transmission 10 based upon a variety of operating characteristics of the powertrain. This includes the operator torque request, typically communicated through inputs to the UI 13 as previously described. Additionally, a demand for output torque is predicated on external conditions, including, e.g., road grade, road surface conditions, or wind load. The operating range state may be predicated on a powertrain torque demand caused by a control module command to operate of the electrical machines in an electrical energy generating mode or in a torque generating mode. The operating range state can be determined by an optimization algorithm or routine operable to determine an optimum system efficiency based upon the operator torque request, battery state of charge, and energy efficiencies of the engine 14 and the first and second electric machines 56 and 72. The control system manages the input torques from the engine 14 and the first and second electric machines 56 and 72 based upon an outcome of the executed optimization routine, and system optimization occurs to improve fuel economy and manage battery charging. Furthermore, the operation can be determined based upon a fault in a component or system.

As is known by one having ordinary skill in the art, any control system includes a reaction time. Changes to a powertrain operating point, comprising the speeds and torques of the various components to the powertrain required to achieve the desired vehicle operation, are driven by changes in control signals. These control signal changes act upon the various components to the powertrain and create reactions in each according to their respective reaction times. Applied to a hybrid powertrain, any change in control signals indicating a new torque request, for instance, as driven by a change in $T_{O\_CMD}$ or as required to execute a transmission shift, creates reactions in each affected torque-generative device and in any affected clutch in order to execute the required changes to respective input torques. Changes to input torque supplied from an engine are controlled by an engine torque request setting the torque generated by the engine, as controlled, for example, through an ECM. Reaction time within an engine to changes in torque request to an engine is impacted by a number of factors well known in the art, and the particulars of a change to engine operation depend heavily on the particulars of the engine employed and the mode or modes of combustion being utilized. In many circumstances, the reaction time of an engine to changes in torque request will be the longest reaction time of the components to the hybrid drive system. Changes to current clutch capacity or clutch torque capacity immediate are controlled by a clutch control system, for example, a hydraulic control system utilizing hydraulic oil to selectively fill a clutch. Reaction time within a transmission to changes in commanded clutch capacity is impacted by a number of factors well known in the art, including reaction times of the involved control devices such as solenoids and clutch fill times. In many circumstances, the reaction time of a transmission to changes in commanded clutch capacity is shorter than the reaction time of an engine to changes in torque request. Reaction time within an electric machine to changes in torque request include time to activate any necessary switches, relays, or other controls and time to energize or de-energize the electric machine with the change in applied electrical power. In many circumstances, the reaction time of an electric machine to changes in torque request is shorter than either the reaction time of a transmission or an engine to changes in control commands.

Figure 5:
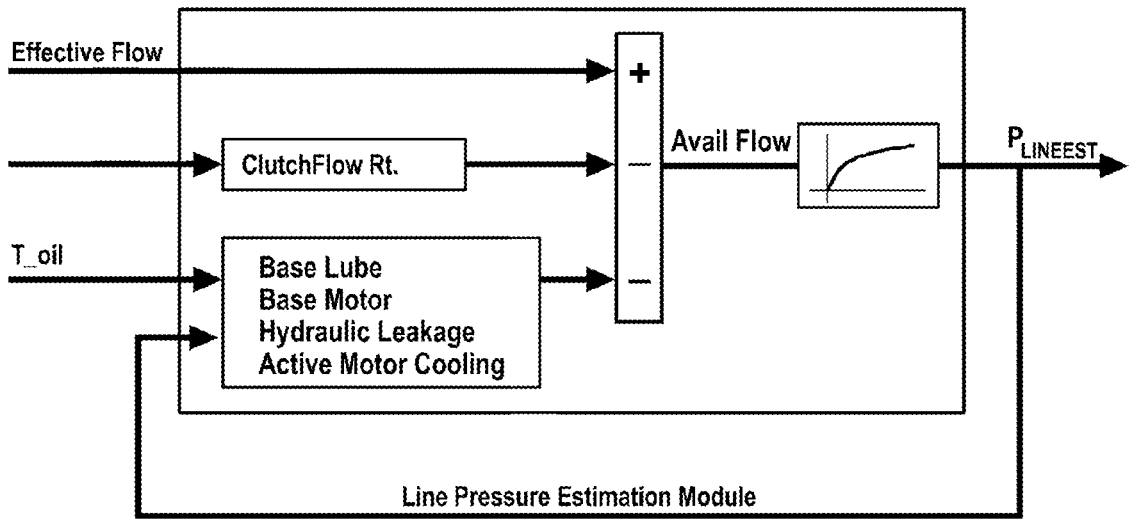
FIG. 5 schematically depicts an exemplary line pressure estimation module capable of estimating hydraulic line pressure, in accordance with the present disclosure.

$P_{LINE}$, as described above, is an important term useful to describe requirements to be fulfilled by the hydraulic control system, such as operation of transmission clutches. However, $P_{LINE}$ is frequently not directly measured. FIG. 5 schematically depicts an exemplary line pressure estimation module capable of estimating $P_{LINE}$, in accordance with the present disclosure. As described above, a number of factors are known to influence $P_{LINE}$, including the effective flow entering the hydraulic lines from the pumps, and the various devices consuming hydraulic pressure from the hydraulic lines of the hydraulic control system. Effective flow, describing the flow generated by all hydraulic pumps feeding the hydraulic control system, can be measured or estimated in a number of ways including a flow meter or through an algorithm modeling factors indicative of flow, including pump speeds, $T_{OIL}$, and back pressure upon the pumps. The module generates an estimate of $P_{LINE}$ or $P_{LINE\_EST}$. Additionally, $P_{LINE\_EST}$ is fed-back to the module to include back pressure caused by $P_{LINE}$ in the determination of $P_{LINE\_EST}$. In this way, factors affecting $P_{LINE}$ can be modeled to generate $P_{LINE\_EST}$ for use in control of the hydraulic control system.

Figure 6:
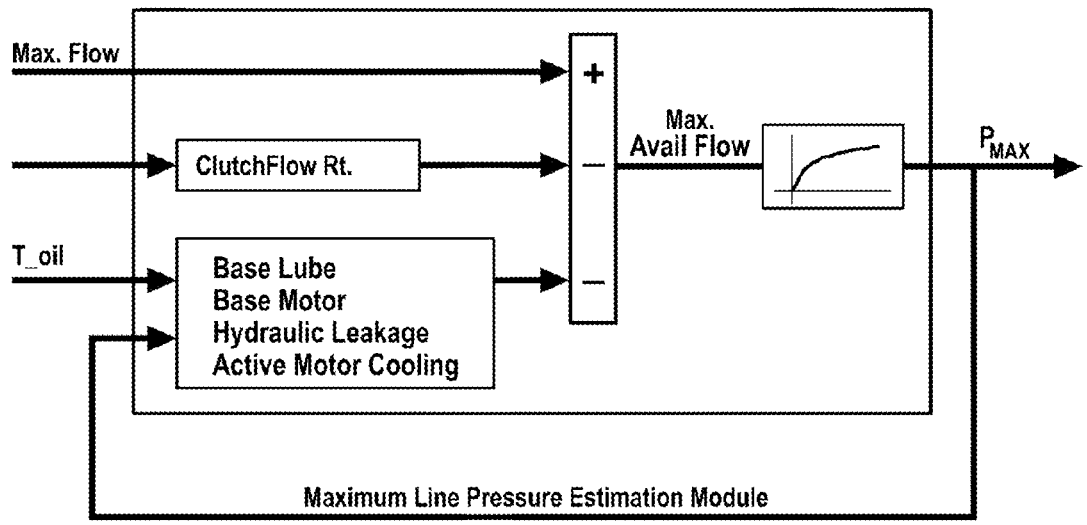
FIG. 6 schematically depicts an exemplary available line pressure estimation module capable of describing the maximum available pressure that can be generated by the hydraulic control system given current vehicle operation, in accordance with the present disclosure.

FIG. 6 schematically depicts an exemplary available line pressure estimation module capable of describing the maximum available pressure that can be generated by the hydraulic control system given current vehicle operation, in accordance with the present disclosure. In similar operation to the line pressure estimation module described above, the maximum available line pressure estimation module inputs describing various factors describing resulting $P_{LINE}$ and models an estimated maximum available pressure or $P_{MAX}$. Maximum flow or the maximum flow that can be delivered by the pumps is a factor of engine speed in the case of the main pump and of a maximum auxiliary pump speed in the case of the auxiliary pump. Maximum auxiliary pump speed can be a set number or can take into account pump operating parameters such as available battery power. In this way, factors affecting $P_{LINE}$ can be modeled to generate $P_{MAX}$ for use in control of the hydraulic control system.

Because $P_{LINE}$ directly affects clutch torque capacity, $P_{LINE\_EST}$ and $P_{MAX}$ can be used to calculate clutch torque capacity immediate minimum and maximum and clutch torque capacity predicted minimum and maximum, a measure of the maximum line pressure that could be commanded given current conditions, respectively. By monitoring terms affecting the operation of the hydraulic control system, capacities of a clutch operated by the hydraulic control system can be determined or predicted.

As described above, clutches employed in the methods described herein are preferably synchronous clutches, including clutch control strategies targeting little or no clutch slip through operation. In order to accomplish such clutch control strategies, the capacity of the clutch must remain greater than the torque transmitted through the applied clutch. A method is disclosed for maintaining clutch reactive torque in excess of torque transmitted through the clutch by using an estimated clutch reactive torque maximum capacity to define a range of input torques that can be applied to the clutch.

Avoiding clutch slip requires a determination, estimation, or prediction of clutch torque capacity actual minimum and maximum for comparison to torque transmitted through the clutch. Under steady operation of an exemplary powertrain, torque transmitted through a clutch is generated in some combination of an engine and an electric machine or machines. As described above, the reaction times of an engine and an electric machine are different, and control strategies affecting changes in torque transmitted through a locked clutch can reflect these differences. For instance, a change in torque request to an electric machine can take place more quickly than a transmission can react to the change. In order to maintain $T_A$ resulting from the electric machine below the clutch torque capacity actual minimum and maximum, a limit restraining $T_A$ to less than the clutch torque capacity immediate minimum and maximum is effective to avoid slip. Conversely, a change in clutch torque capacity immediate minimum and maximum to higher capacity values up to a clutch torque capacity predicted minimum and maximum can take place more quickly than an engine can react to a change in torque request. As a result, $T_I$ need not be restrained artificially by the clutch torque capacity immediate minimum and maximum, as clutch capacity can be changed more quickly than $T_I$. These relative reaction times can be utilized to manage $T_I$ and the total torque transmitted through a clutch. As described above, $P_{LINE\_EST}$ and $P_{MAX}$ can be estimated based upon operation of the hydraulic pumps and by analyzing the operation of the hydraulic control system. From these values, clutch torque capacity immediate minimum and maximum and clutch torque capacity predicted minimum and maximum can be generated. Using clutch torque capacity predicted minimum and maximum as a limiting factor for $T_I$, a preferred input torque or $T_{I\_DES}$ can be determined to fulfill to $T_{O\_CMD}$. As a result, $T_I$ and clutch torque capacity immediate minimum and maximum can change to the new torque request, changing $T_I$ while avoiding clutch slip.

Based upon the prediction of clutch torque capacity, errors in the clutch torque capacity predicted minimum and maximum can occur, but any errors which would result in the torque transmitted through the clutch exceeding the clutch torque capacity actual minimum and maximum can be compensated for through operation of the electric machine counteracting the excess engine torque. Because the electric machine has a much shorter reaction time than the other involved devices and because the control system continues to monitor clutch torque capacity immediate minimum and maximum through the change, the electric machine can be utilized as a feedback mechanism, balancing $T_I$ and clutch torque capacity immediate minimum and maximum, to avoid slip through the reaction to command changes in the powertrain.

Figure 7:
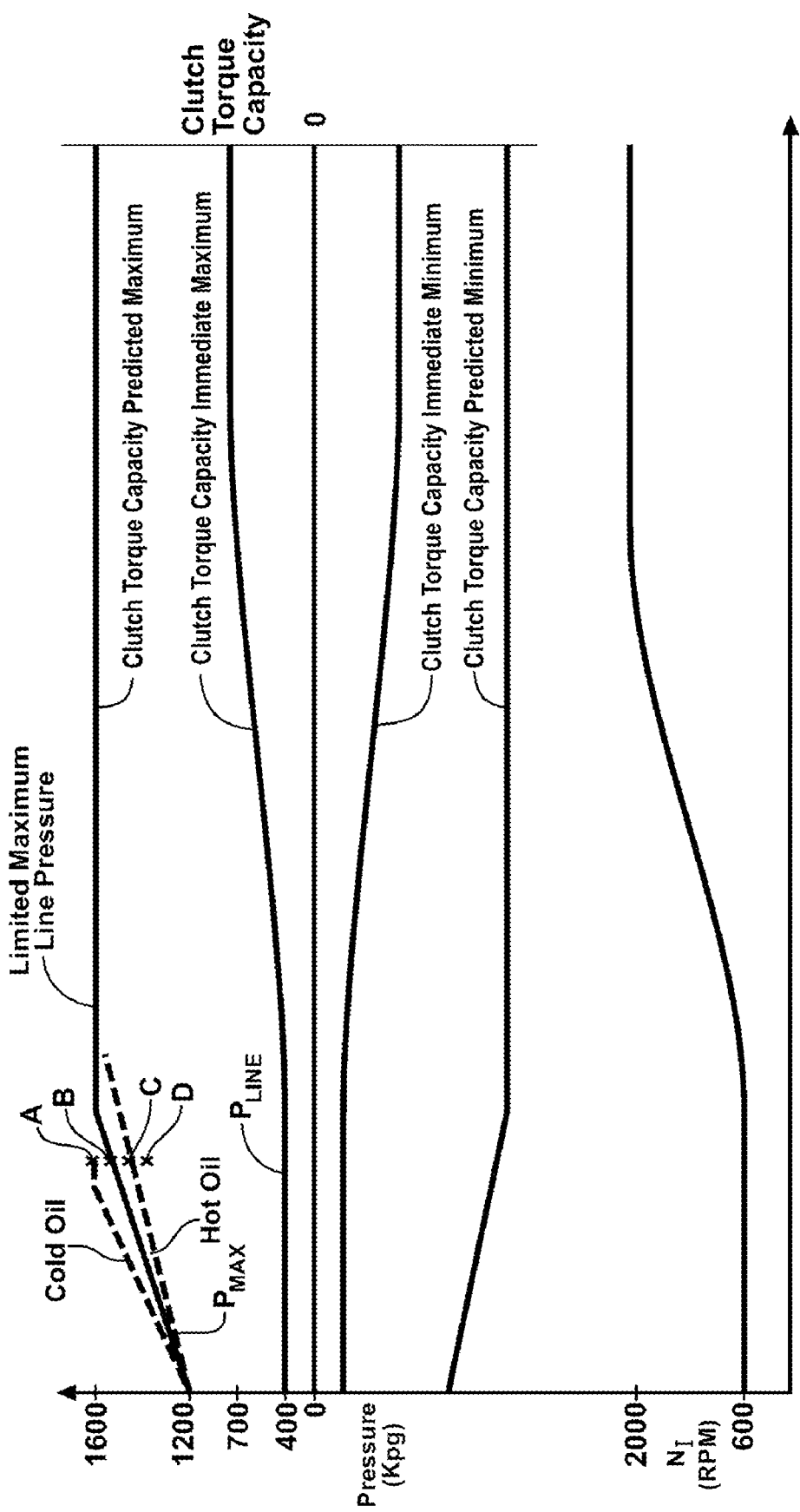
FIG. 7 graphically illustrates an exemplary change in powertrain operation, demonstrating a relationship of clutch capacity terms and engine speed, in accordance with the present disclosure.

FIG. 7 graphically illustrates an exemplary change in powertrain operation, demonstrating a relationship of clutch capacity terms and engine speed, in accordance with the present disclosure. Two sections of the graph are represented with a common timescale. The top portion of the graph depicts hydraulic line pressure through a time span. Because, as described above, line pressure is directly related to clutch torque capacity, the same data points can be used to demonstrate torque that can be transmitted through a clutch during the time span. Additionally, it will be appreciated as depicted that clutch capacity can be represented in either a positive or a negative direction, as represented by the minimum and maximum curves depicted in FIG. 7. In the bottom section of the graph, engine speed, $N_I$, is depicted on the same time scale as the line pressure changes of the top section. As described above and consistent with the exemplary data depicted on FIG. 7, a main hydraulic pump is known to be directly driven by the engine. As a result, an increase in $N_I$, keeping factors affecting current line pressure such as a main hydraulic pump flow regulator and draw from the functions served by the hydraulic control system constant, shows a correlating time-delayed increase in $P_{LINE}$ demonstrating the effects of increasing main hydraulic pump speeds. Returning to the top section of the graph, the $P_{LINE}$ can be directly translated into a clutch torque capacity immediate minimum and maximum describing the torque that can currently be applied through the applied clutch. $P_{MAX}$, describing the maximum $P_{LINE}$ that could currently be achieved if both pumps in the exemplary hydraulic control system were operated at their highest setting, can be directly translated into a clutch torque capacity predicted minimum and maximum. As shown in the exemplary data where hydraulic line pressure equals 1600 Kpa, hydraulic control systems frequently impose a limited maximum line pressure to avoid damage to the system. At a selected time, points A-D are depicted. B illustrates an exemplary clutch torque capacity predicted maximum value as estimated based upon analysis of related inputs. As demonstrated by the hot oil and cold oil lines, the maximum achievable line pressure is directly affected by the temperature of the hydraulic oil for a given engine speed. Points A and C depict clutch torque capacity predicted maximum values that would exist depending upon the effect of oil temperature. Clutch torque capacity predicted minimum and maximum values, as described above, are used to set $T_{I\_DES}$. However, it will be appreciated that estimated values in complex computer models or algorithms can deviate from actual values. Point D depicts a clutch torque capacity actual maximum value for the exemplary system, affected by some factor to a value less than the predicted value represented by point B. In such a condition, the clutch torque capacity predicted maximum value is higher than the clutch torque capacity actual maximum value. The clutch torque capacity predicted maximum, utilized as an input factor to determine $T_{I\_DES}$, therefore generates an estimate of torque capacity higher than can actually be achieved at that point. However, as noted above, current clutch capacity is also tracked as the clutch torque capacity immediate minimum and maximum, and, in the event the clutch torque capacity predicted maximum value is commanded, through the course of additional hydraulic line pressure ramping up to meet the predicted maximum value, the clutch torque capacity immediate maximum value will reveal the discrepancy and provide an ability for an electric machine with a quick reaction time to counteract any excess $T_I$ applied due to the error in the estimation of point B.

Figure 1:
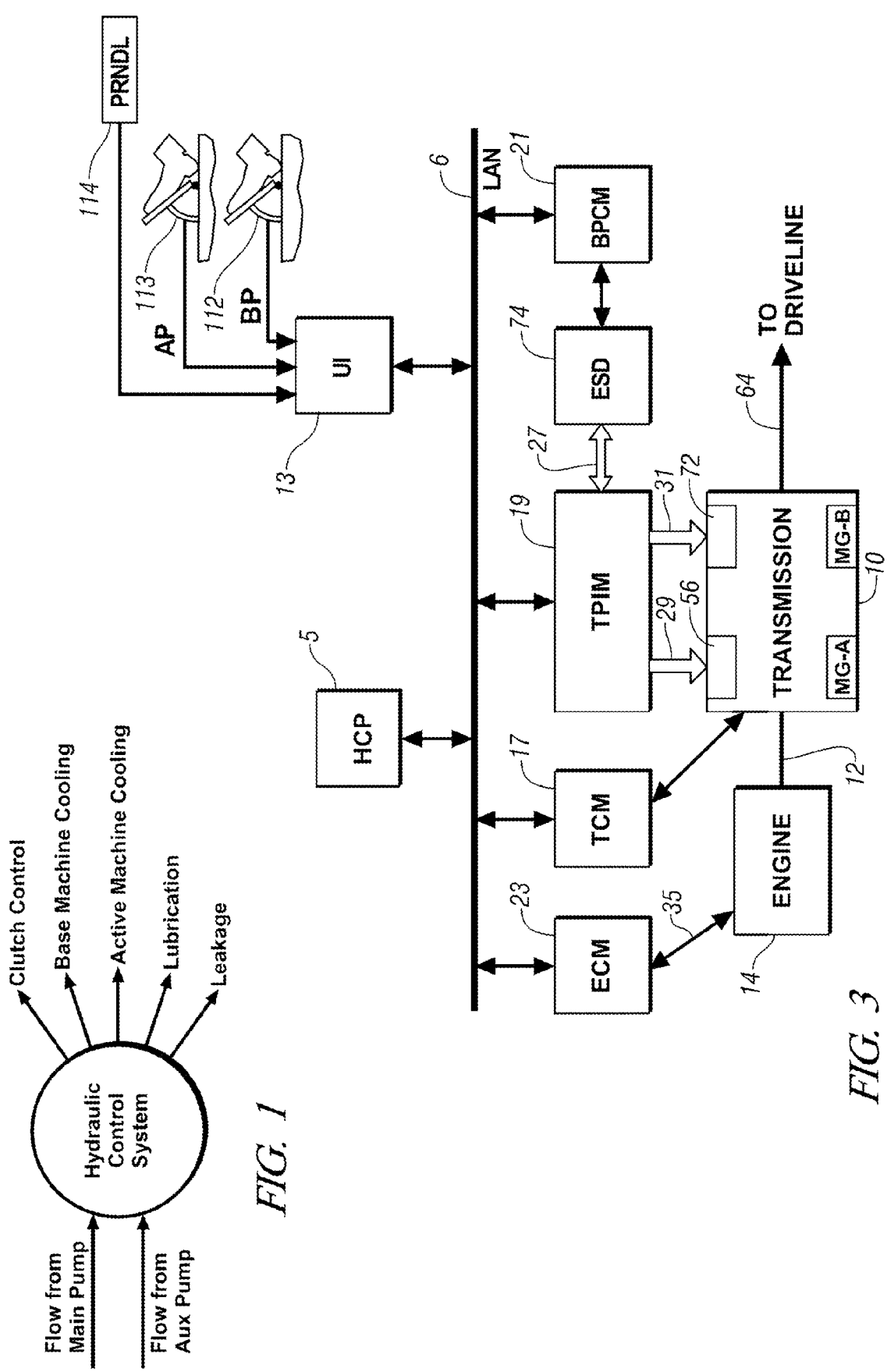
FIG. 1 schematically illustrates a model of factors impacting hydraulic flow in an exemplary hydraulic control system, in accordance with the present disclosure.
Figure 8:
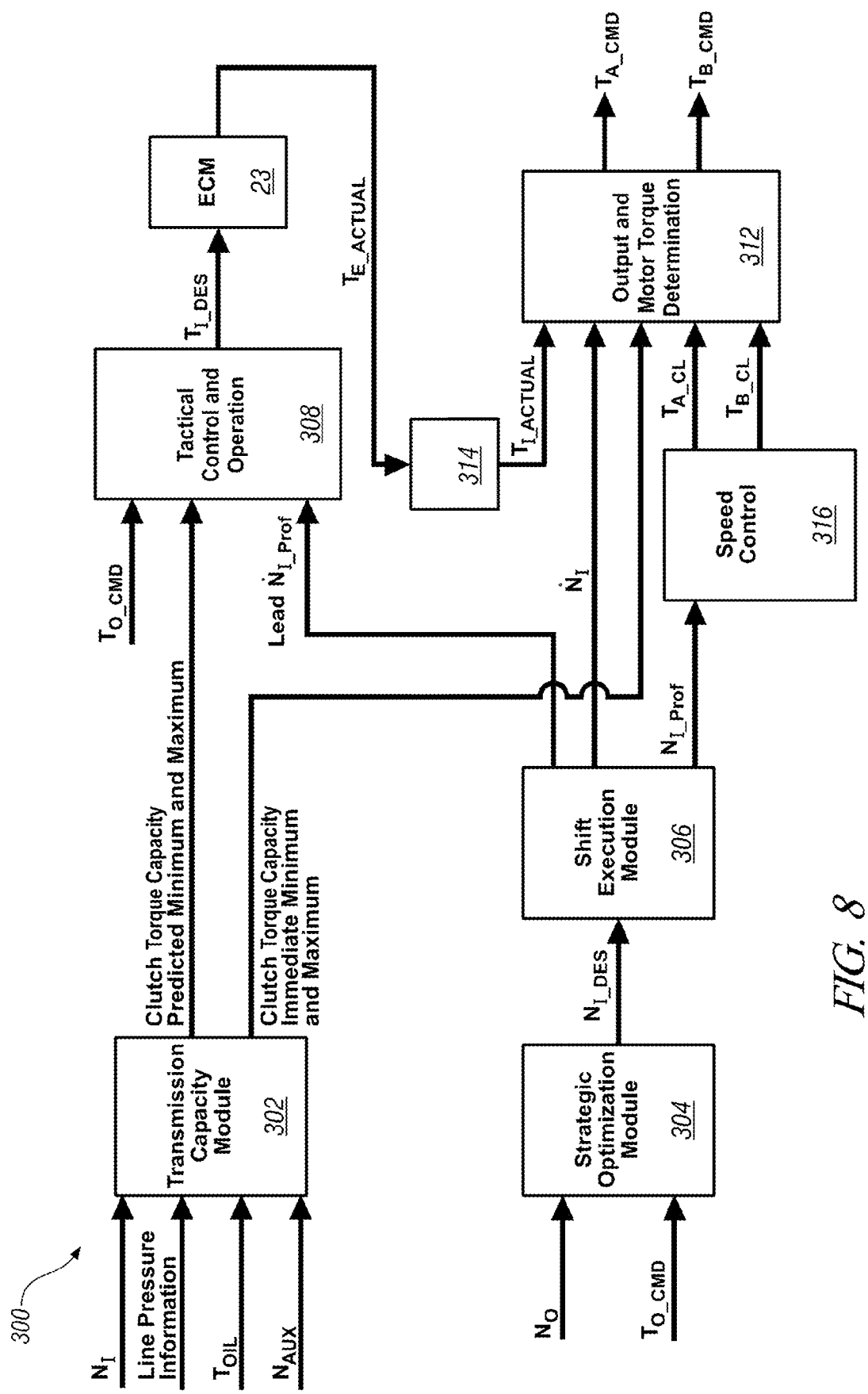
FIG. 8 schematically illustrates an exemplary flow of information coordinating engine torque and maximum available clutch torque capacity, in accordance with the present disclosure.

FIG. 8 schematically illustrates an exemplary flow of information coordinating engine torque and maximum available clutch torque capacity, in accordance with the present disclosure. Exemplary powertrain control system 300 comprises a transmission capacity module 302, a strategic optimization module 304, a shift execution module 306, a tactical optimization and control module 308, ECM 23, an output and motor torque determination module 312, an input torque determination module 314, and a speed control module 316. Transmission capacity module 302 receives information regarding the operation of the hydraulic control system, and transforms information related to a hydraulic pressure available to operate clutches into clutch torque capacities. Various inputs can be utilized to estimate available and maximum line pressures. In one particular exemplary embodiment, line pressure information in the form of $P_{LINE\_EST}$ or $P_{MAX}$ can be calculated separately, as described above in association with FIGS. 5 and 6. In another embodiment, inputs related to FIG. 1 can be monitored to estimate conditions within the hydraulic control system. For example, inputs can include information about flows to functions served by the hydraulic control system, information related to pump speeds in the form of $N_I$, main pump speed, or auxiliary pump speed, $N_{AUX}$, and hydraulic oil temperature. Inputs related to pump speed can be used to calculate pump flows into the system. In the alternative, pump flows or flows of hydraulic fluid into the hydraulic control system can be measured directly or calculated from available measurements. From these inputs, transmission capacity module 302 estimates maximum and current hydraulic line pressure available for clutch operation and provides a clutch torque capacity immediate minimum and maximum and a clutch torque capacity predicted minimum and maximum. Strategic optimization module 304 receives information regarding the current operation of the powertrain, in this example, $N_O$ and $T_{O\_CMD}$, and generates $N_{I\_DES}$, describing a desired engine speed fulfilling a $T_{O\_CMD}$ and a number of operational factors known in the art relating engine operation to requested torque. Shift execution module 306 receives $N_{I\_DES}$ as an input and determines a desired transition that must be effected upon $N_I$ based upon $N_{I\_DES}$. In order to accomplish this desired transition, shift execution module 306 determines an $N_I$ profile, a desired profile for $N_I$ through the transition. In order to accomplish changes to $N_I$ according to $N_I$ profile, changes must be commanded to the engine. As described above, changes in engine operation to engine commands include a reaction time. Use of a lead period calibrated to the difference in reaction times between the engine and the electric machine is disclosed. By using a lead period to coordinate issuing of engine commands to desired actual engine changes, engine command and electric machine commands can be synchronized to provide simultaneous or nearly simultaneous changes to $T_O$. In order to affect this change based upon the lead period, a lead $N_{I\_DOT}$ profile is determined by shift execution module 306, profiling a desired change to $N_I$ including a lead period coordinating engine commands to desired actual changes to $N_I$. Shift execution module also determines actual $N_{I\_DOT}$. Tactical optimization and control module 308 receives inputs including $T_{O\_CMD}$, clutch torque capacity predicted minimum and maximum, and lead $N_{I\_DOT}$ profile and determines $T_{I\_DES}$, or a current torque command necessary to fulfill the inputs. Because, as described above, the engine takes longer than a clutch to react to changes in commands, tactical optimization and control module 308 can utilize clutch torque capacity predicted minimum and maximum instead of clutch torque capacity immediate minimum and maximum to constrain engine operation based upon clutch limits because the transmission can react and increase clutch capacity faster than the engine can increase $T_I$, therefore, allowing the engine to operate within a $T_I$ range up to the maximum available clutch reactive torque that can be provided at any time. ECM 23 receives $T_{I\_DES}$ and issues control commands to the engine, resulting in $T_{E\_ACTUAL}$, the actual torque generated by the engine. Input torque determination module 314 monitors a number of factors affecting engine performance and estimates $T_{I\_ACTUAL}$, wherein $T_{I\_ACTUAL}$ or the actual input torque to the transmission from the engine equals $T_{E\_ACTUAL}$ minus any losses. Speed control module 316 receives the $N_I$ profile as an input and outputs electric machine closed loop control controls, $T_{A\_CL}$ and $T_{B\_CL}$, based upon input speed error and clutch speed error. Output and motor torque determination module 312 receives as inputs $T_{I\_ACTUAL}$, $N_{I\_DOT}$, clutch torque capacity immediate minimum and maximum, and $T_{A\_CL}$ and $T_{B\_CL}$ and generates commands to the electric machines in the form of $T_{A\_CMD}$ and $T_{B\_CMD}$. Output and motor torque determination module 312 utilizes clutch torque capacity immediate minimum and maximum instead of clutch torque capacity predicted minimum and maximum to constrain electric machine operation based upon clutch limits because the electric machines can react and increase torque transmitted through the clutch more quickly than the clutch can react to commands to increase clutch capacity. In this way, the electric machines can operate within the current capacity of the clutch without exceeding clutch torque capacity and causing slip. In this way, exemplary control system 300 utilizes information describing current clutch capacity and maximum available clutch capacity to manage torque application in a powertrain.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a powertrain comprising an electro-mechanical transmission mechanically-operatively coupled to an internal combustion engine and an electric machine adapted to selectively transmit mechanical power to an output member, said method comprising:
   monitoring a rotational speed of said engine;
   monitoring a temperature of a transmission fluid;
   determining a maximum hydraulic pressure within a hydraulic control system based upon said rotational speed of said engine and said temperature of said transmission fluid;
   determining a predicted clutch torque capacity based upon said maximum hydraulic pressure;
   generating a preferred input torque from said engine based upon said predicted clutch torque capacity; and
   utilizing said preferred input torque to control said engine.

2. The method of claim 1, further comprising:
   monitoring an actual input torque resulting from said control of said engine;
   determining a current hydraulic pressure based upon said rotational speed of said engine and said temperature of said transmission fluid;
   determining a current clutch torque capacity based upon said current hydraulic pressure; and
   generating electric machine torque commands based upon said current clutch torque capacity and said actual input torque.

3. The method of claim 2, wherein determining said current hydraulic pressure is further based upon a speed of an auxiliary hydraulic pump.

4. The method of claim 2, wherein determining said maximum hydraulic pressure is further based upon a maximum speed of said auxiliary hydraulic pump.

5. The method of claim 2, wherein determining said current hydraulic pressure is further based upon operation of a hydraulic control system including flows to functions served by said hydraulic control system.

6. The method of claim 2, said generating electric machine torque commands includes commands to a second electric machine.

7. The method of claim 1, wherein determining a maximum hydraulic pressure is further based upon a maximum speed of an auxiliary hydraulic pump.

8. The method of claim 1, wherein determining said maximum hydraulic pressure is further based upon operation of said hydraulic control system including flows to functions served by said hydraulic control system.

9. Apparatus for controlling a powertrain comprising an electro-mechanical transmission mechanically-operatively coupled to an internal combustion engine and an electric machine adapted to selectively transmit mechanical power to an output member, said apparatus comprising:

a plurality of hydraulically actuated clutches achieving said selective transmission of power;

a main hydraulic pump rotatably connected to and powered by the engine;

an auxiliary hydraulic pump;

a hydraulic control system fluidly connected to said main hydraulic pump and said auxiliary hydraulic pump and providing hydraulic flows to said hydraulically actuated clutches; and a powertrain control system monitoring a speed of said main hydraulic pump,
  monitoring a maximum speed of said auxiliary hydraulic pump,
  monitoring a temperature of a transmission fluid,
  monitoring operation of said hydraulic control system,
  determining a maximum hydraulic pressure of said hydraulic control system based upon said speed of said main hydraulic pump, said maximum speed of said auxiliary hydraulic pump, said temperature of said transmission fluid, and said operation of said hydraulic control system,
  determining a predicted clutch torque capacity based upon said maximum hydraulic pressure,
  determining a preferred input torque from said engine based upon said predicted clutch torque capacity, and
  controlling said engine based upon said preferred input torque.

10. The apparatus of claim 9,
wherein said powertrain control system further
  monitors a current speed of said auxiliary hydraulic pump,
  determines a current hydraulic pressure of said hydraulic control system based upon said speed of said main hydraulic pump, said current speed of said auxiliary hydraulic pump, said temperature of said transmission fluid, and said operation of said hydraulic control system,
  determines a current clutch torque capacity based upon said current hydraulic pressure, and
  generates electric machine torque commands based upon said current clutch torque capacity and said preferred input torque from said engine.

11. The apparatus of claim 10,
wherein said powertrain control system further generates electric machine torque commands to a second electric machine based upon said current clutch torque capacity and said preferred input torque from said engine.

\* \* \* \* \*